United States Patent
Green et al.

(10) Patent No.: US 12,065,870 B2
(45) Date of Patent: *Aug. 20, 2024

(54) ANTI-GRAFFITI LAMINATE WITH VISUAL INDICIA

(71) Applicant: Graffiti Shield, Inc., Anaheim, CA (US)

(72) Inventors: Jeffrey Green, Anaheim, CA (US); Michael Schuch, Anaheim, CA (US)

(73) Assignee: Graffiti Shield, Inc., Anaheim, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,022

(22) Filed: Aug. 1, 2023

(65) Prior Publication Data
US 2023/0374846 A1    Nov. 23, 2023

Related U.S. Application Data

(63) Continuation of application No. 17/314,829, filed on May 7, 2021, now Pat. No. 11,719,036, which is a
(Continued)

(51) Int. Cl.
*E06B 3/30* (2006.01)
*B29C 65/00* (2006.01)
(Continued)

(52) U.S. Cl.
CPC .............. *E06B 3/30* (2013.01); *B32B 7/06* (2013.01); *B32B 7/12* (2013.01); *C08J 5/18* (2013.01); *B29C 65/76* (2013.01); *B29C 66/0326* (2013.01); *B29C 66/0346* (2013.01); *B29C 66/45* (2013.01); *B29C 2793/0018* (2013.01); *B29C 2793/0036* (2013.01); *B29C 2793/0045* (2013.01); *B29C 2793/0054* (2013.01); *B32B 3/02* (2013.01); *B32B 3/266* (2013.01); *B32B 7/02* (2013.01); *B32B 27/08* (2013.01);
(Continued)

(58) Field of Classification Search
CPC .... B32B 7/02; B32B 7/06; B32B 7/12; B32B 3/02; B32B 3/266; B32B 3/30; B32B 27/08; B32B 27/16; B32B 2255/26; B32B 2307/748; B32B 2310/0843; B32B 2250/24; B32B 2307/412; B32B 2605/006; E06B 3/30; E06B 5/10; C08J 5/18; B29C 65/4825; B29C 65/76; B29C 66/0326; B29C 66/0346; B29C 66/45; B29C 2793/0018; B29C 2793/0036; B29C 2793/0045; B29C 2793/0054
USPC ... 156/60, 71, 247, 250, 252, 253, 257, 268, 156/272.2, 272.8, 701, 714; 428/40.1, 428/41.7, 42.1, 98, 131, 134, 136, 192
See application file for complete search history.

(56) References Cited

U.S. PATENT DOCUMENTS 3,765,994 A * 10/1973 Quaintance ............ H05K 3/106
                                                        428/458
4,654,101 A *  3/1987 Kane ........................ G09F 7/04
                                                        156/264
(Continued)

*Primary Examiner* — Philip C Tucker
*Assistant Examiner* — Brian R Slawski
(74) *Attorney, Agent, or Firm* — Crockett & Crockett, PC; K. David Crockett, Esq.; Niky Economy Syrengelas, Esq.

(57) ABSTRACT

An anti-graffiti window film covering system that includes multiple polymeric film layers. Each layer includes a unique visual indicia to identify the number of sheets remaining in the system.

5 Claims, 6 Drawing Sheets

Related U.S. Application Data continuation of application No. 16/171,365, filed on Oct. 26, 2018, now Pat. No. 11,002,063.

(51) Int. Cl.

| | |
|---|---|
| *B29C 65/76* | (2006.01) |
| *B32B 3/02* | (2006.01) |
| *B32B 3/26* | (2006.01) |
| *B32B 7/02* | (2019.01) |
| *B32B 7/06* | (2019.01) |
| *B32B 7/12* | (2006.01) |
| *B32B 27/08* | (2006.01) |
| *B32B 27/16* | (2006.01) |
| *C08J 5/18* | (2006.01) |

(52) U.S. Cl.
CPC ........... *B32B 27/16* (2013.01); *B32B 2255/26* (2013.01); *B32B 2307/748* (2013.01); *B32B 2310/0843* (2013.01)

(56) References Cited

U.S. PATENT DOCUMENTS

| | | | | |
|---|---|---|---|---|
| 5,236,752 | A * | 8/1993 | Dressler | B32B 7/06 428/137 |
| 8,292,347 | B1 * | 10/2012 | Drake | B60J 1/2094 160/370.21 |
| 2004/0121105 | A1 * | 6/2004 | Janssen | B32B 7/06 428/40.1 |
| 2010/0313455 | A1 * | 12/2010 | Kim | B32B 27/36 40/594 |
| 2015/0246575 | A1 * | 9/2015 | Green | B44C 1/105 156/64 |

* cited by examiner

ANTI-GRAFFITI LAMINATE WITH VISUAL INDICIA

This application is a continuation of U.S. application Ser. No. 17/314,829. Filed Mar. 7, 2021 now U.S. Pat. No. 11,719,036, which is a continuation of U.S. application Ser. No. 16/171,365, filed Oct. 26, 2018, now U.S. Pat. No. 11,002,063.

FIELD OF THE INVENTIONS

The inventions described below relate to the field of anti-graffiti window film coverings.

BACKGROUND OF THE INVENTIONS

Anti-graffiti window film laminate systems provide the benefit of easy and quick removal and replacement of film sheets without the hassle of replacing windows. Current anti-graffiti window film systems include a stepped edge in a corner that peels away one layer at a time. The existing peeling film systems make it difficult for a user to identify the remaining number of layers of film within the system from a distance. The user must examine the corner critically in order to identify the number of remaining layers in order to only remove the uppermost layer. The inability to view the number of remaining layers is often exacerbated by the fact that the installation of these disposable protective films occurs in dark environments such service shops. This contributes to the difficulty of viewing by the user and often results in inadvertent disposal of multiple viable layers. The result is often increased services times as films are replaced sooner than necessary as well as increased cost in inadvertent discarding of viable layers.

SUMMARY

The devices and methods described below provide for anti-graffiti window film covering systems. The system includes a multi-layer polymeric film for placement on a vehicle window. Each film layer includes visual indicia to clearly identify the number of sheets remaining in the film layer system. Each disposable film layer includes a unique etched visual marking that is present only within the individual layer. The unique etched visual marking identifies the number of remaining layers to ensure that the user removes the desired layer and not more layers than required. The etched visual indicia provides for easy and accurate identification of the number of layers remaining to the user.

A method of making multiple ablations on a multi layer polymeric film is also provided. The method includes the steps of ablating each individual polymeric layer with a unique etch. All of the unique etches are visible when all of the polymeric sheets are staked on top of each other. However, each etch uniquely indicates the number of remaining layers for identification by the user.

DETAILED DESCRIPTION OF THE INVENTIONS

Figure 1:
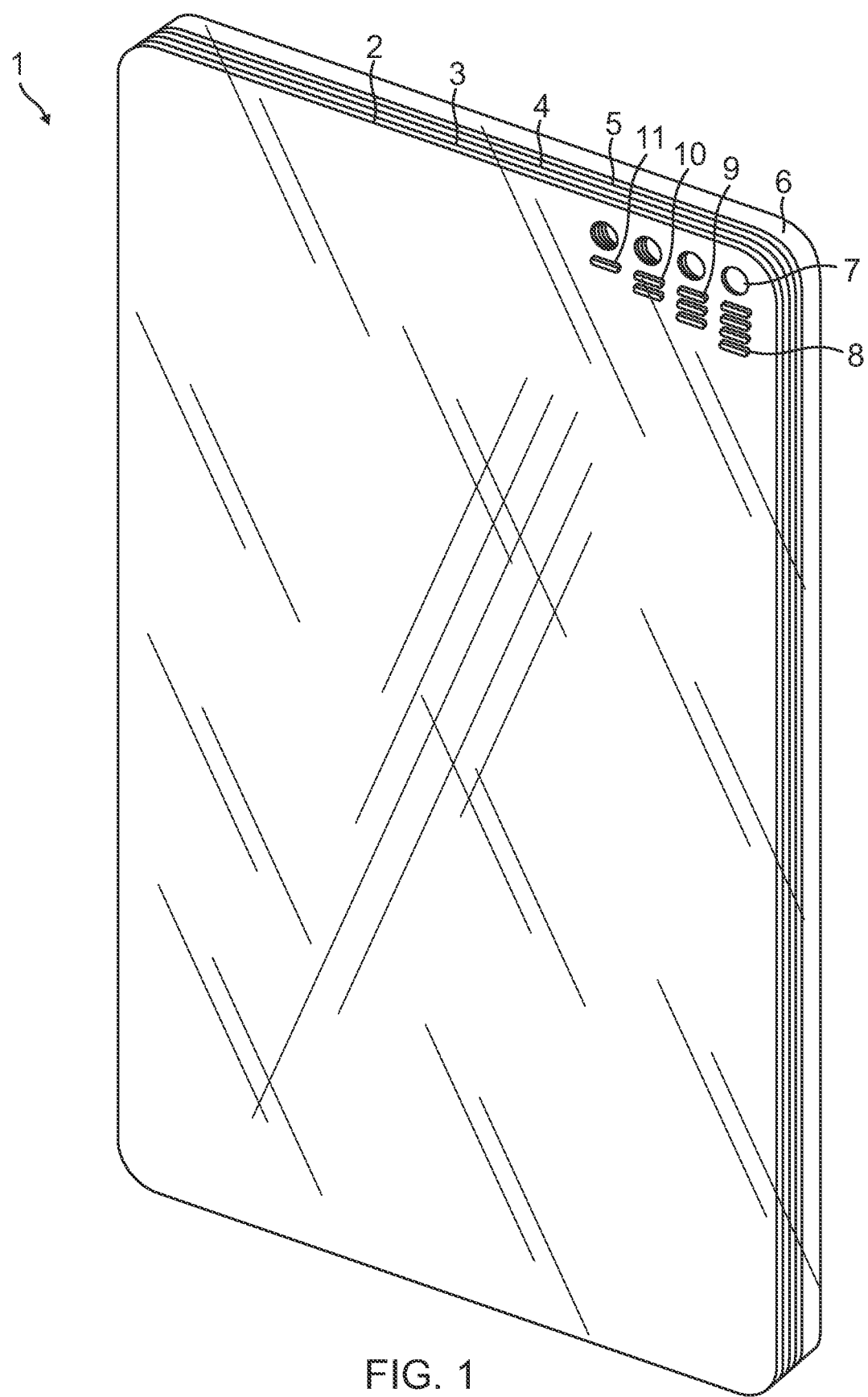
FIG. 1 is a perspective view of an anti-graffiti window film laminate system including a transparent stack of polymeric sheets that include an etching identifying there are four sheets in the stack.

FIG. 1 is a perspective view of an anti-graffiti window film laminate system comprised of a transparent stack of sheets 2, 3, 4, 5 stacked upon each other. The transparent stacked sheets have a first side having a surface area and a second side having a surface area. A bonding layer for releasable removal of the film laminates from each other is contained on the second side of each layer so that the sheets releasably adhere to each other. The top layer contains no adhesive on the first surface. The entire stack of disposable sheets is secured to a window 6 to protect the window from graffiti and other damage. Each sheet includes an aperture 7 for insertion of a tool to remove and dispose of the top most sheet. Alternatively, the top most sheet can be removed by hand. In close proximity to each aperture is a unique visual indicia 8, 9, 10, 11 that is easily visible by the user. The visible indicia represents the number of layers remaining in the system. In this figure, the top most layer visual indicia 8 is represented by four etched hash tags. The etching is laser cut, laser marked, laser engraved, blade cut or alternatively cut via any other method, as indicator marks that are only cut through their prospective layer. When the system is first placed on the desired surface, the sheets are stacked on top of each other and all removal apertures are visible. The top most sheet also displays all of the visual indicia or etchings 9, 10, 11 of each of the sheets beneath it. The top sheet has four etchings 8, the second sheet below the top sheet has three etchings 9, the third sheet below the second sheet has two etchings 10 and the bottom sheet has one etching 11.

Figure 2:
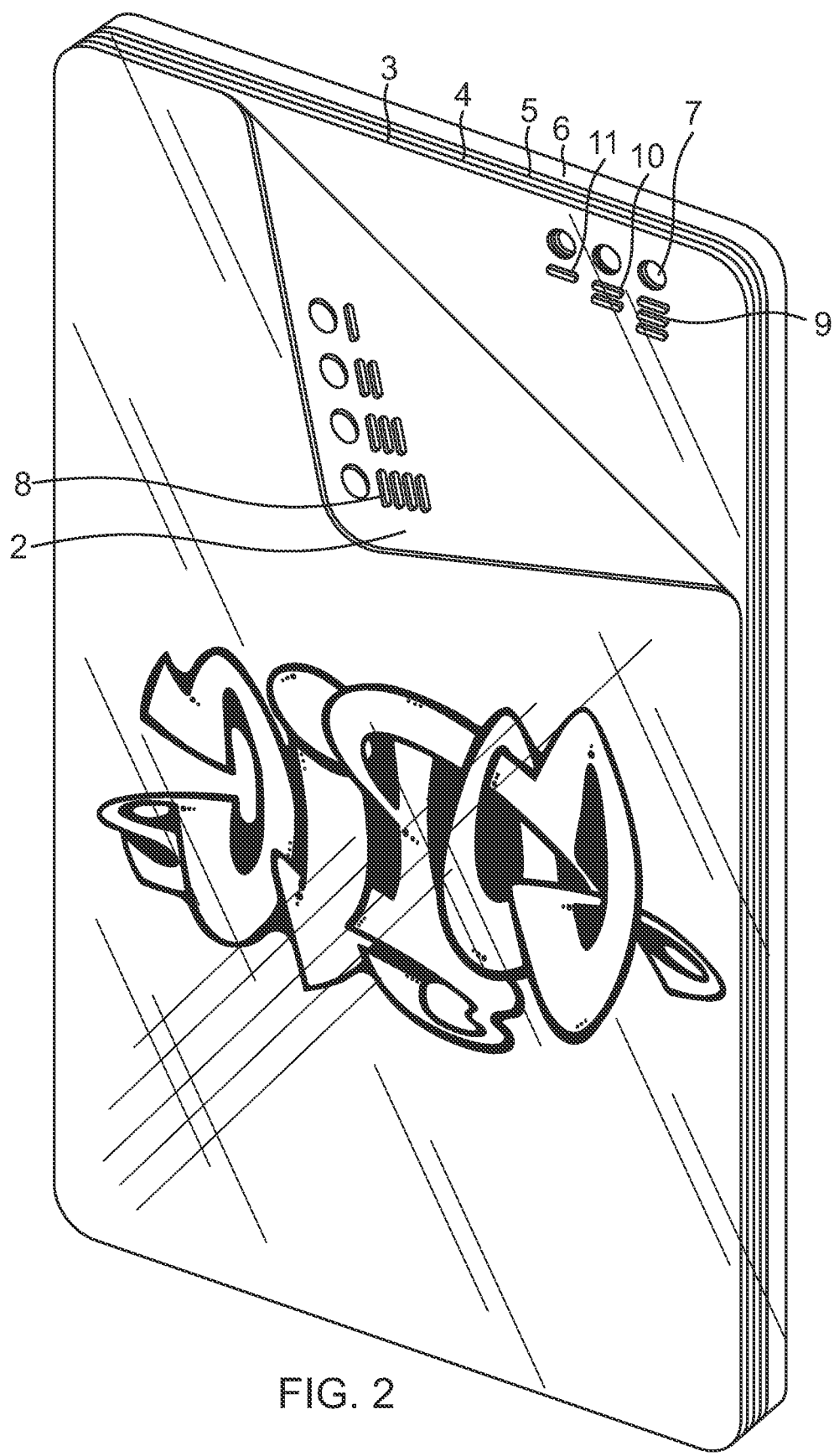
FIG. 2 is a perspective view of the system with the top sheet peeled away and where the second sheet includes an etching identifying that there are three sheets remaining in the stack.

FIG. 2 is a perspective view of the system with the top sheet 2 peeled away. The second sheet 3 includes an aperture for sheet removal and a second etching 9 that is different than the etching 8 of the topmost or first layer 2. The etching on the second layer 9 identifies that there are three sheets remaining in the stack. In this figure, the etching on the second layer is three hash tags, which is different than the etching of the first layer 8. The unique etching on this layer is clearly recognizable by a user and understood to identify the instant number of layers remaining.

Figure 3:
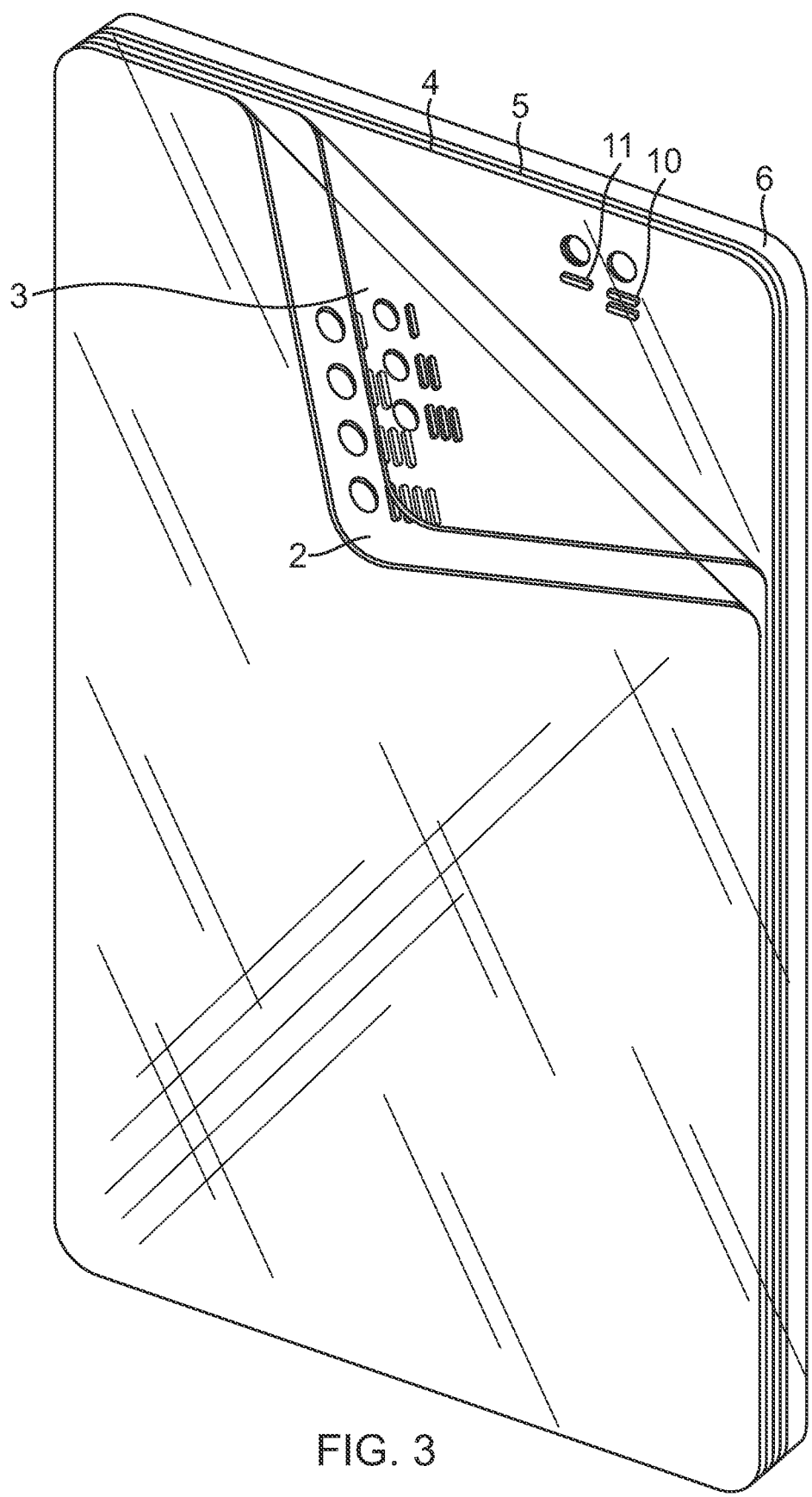
FIG. 3 is a perspective view of the system with the top two sheets peeled away and where the third sheet includes an etching identifying that there are two sheets remaining in the stack.

FIG. 3 illustrates is a perspective view of the system with the top two sheets 2, 3 peeled away. The third sheet 4 includes an aperture for sheet removal and a third etching 10 that is different than the etchings 8, 9 of the two previous layers. The etching on the third layer 10 identifies that there are two sheets remaining in the stack. In this figure, the etching on the third layer 10 is two hash tags, which is different than the etching of the first and second layers. The unique etching on this layer is clearly recognizable by a user and understood to identify the instant number of layers remaining.

Figure 4:
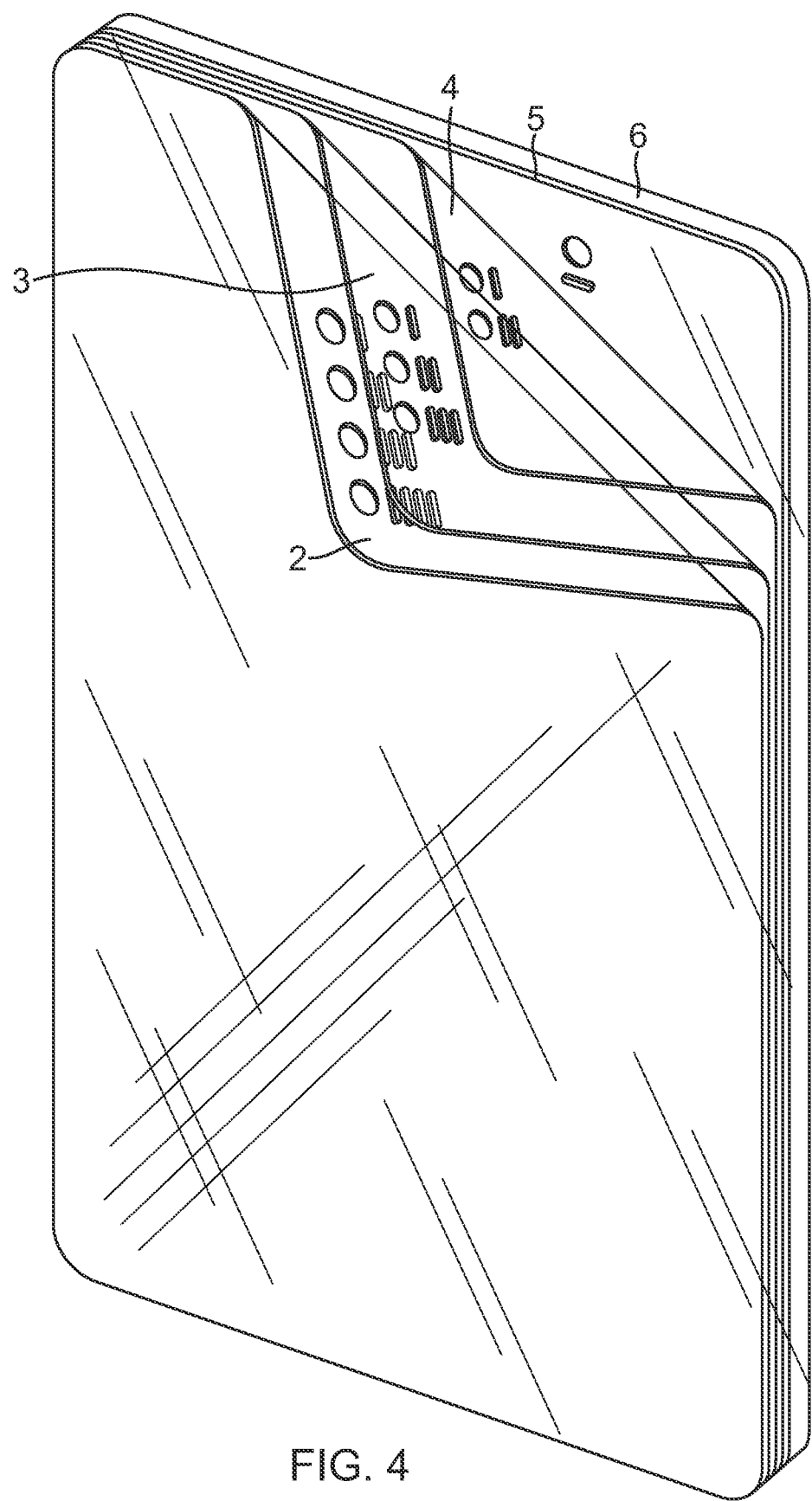
FIG. 4 is a perspective view of the system with the top three sheets peeled away and where the fourth sheet includes an etching identifying that there is one sheet remaining in the stack.

FIG. 4 illustrates is a perspective view of the system with the top three sheets 2, 3, 4 peeled away. The bottom most or fourth sheet 5 includes an aperture for sheet removal and a fourth etching 11 that is different than the etching 8 of the three previous layers 8, 9, 10. The etching on the fourth layer 11 identifies that it is the final sheet of the original stack. All other top sheets have been removed and discarded from the laminate stack. Upon removal of the final sheet, a user will have to replace the anti-graffiti window peeling film system with another stackable layer of removable sheets. In this figure, the etching on the final layer is clearly recognizable by the user as indicative of the final layer and therefore the user recognizes a new system must be installed on the window.

Figure 5:
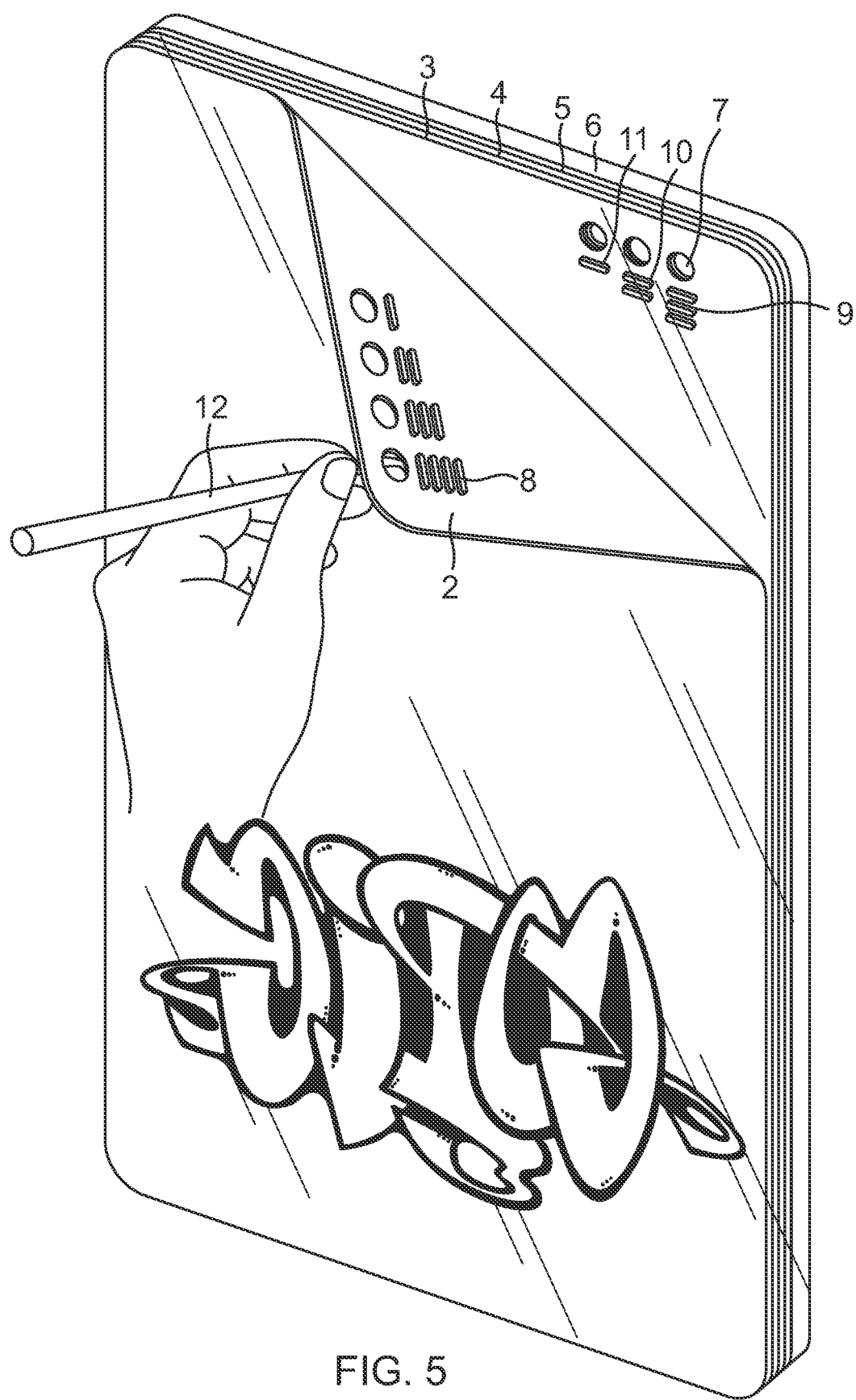
FIG. 5 is a perspective view of a user pulling away the sheet layers in order to dispose of the graffitied sheet.

FIG. 5 is a perspective view of a user pulling away the sheet layers in order to dispose of graffiti or damaged sheets. In use, when the top sheet has been graffitied or damaged, the top sheet is discarded. The remaining top sheet is then clean or undamaged for use until it becomes damaged and then must be also removed. The etching on the top sheet clearly indicates the number of remaining sheets below the damaged sheet. Thus, a user removes only the topmost damaged sheet as recognized by the etchings on remaining on the sheets. Because each sheet contains its own unique etching, and each etching is only contained on its individual layer, a user can easily visually identify the number of layers remaining. In addition, in dark work areas, the user may user the tool 12 or their finger to feel the number of remaining layers in the system. The etching associated with the top most reaming layer is closest to the aperture for removal. The remaining etches are not contained on the current layer and therefore the user understands and immediately identifies the layer that must be removed. This ensures a decrease in work time and increase in efficiency in that no clean layer is unintentionally removed and discarded.

Figure 6:
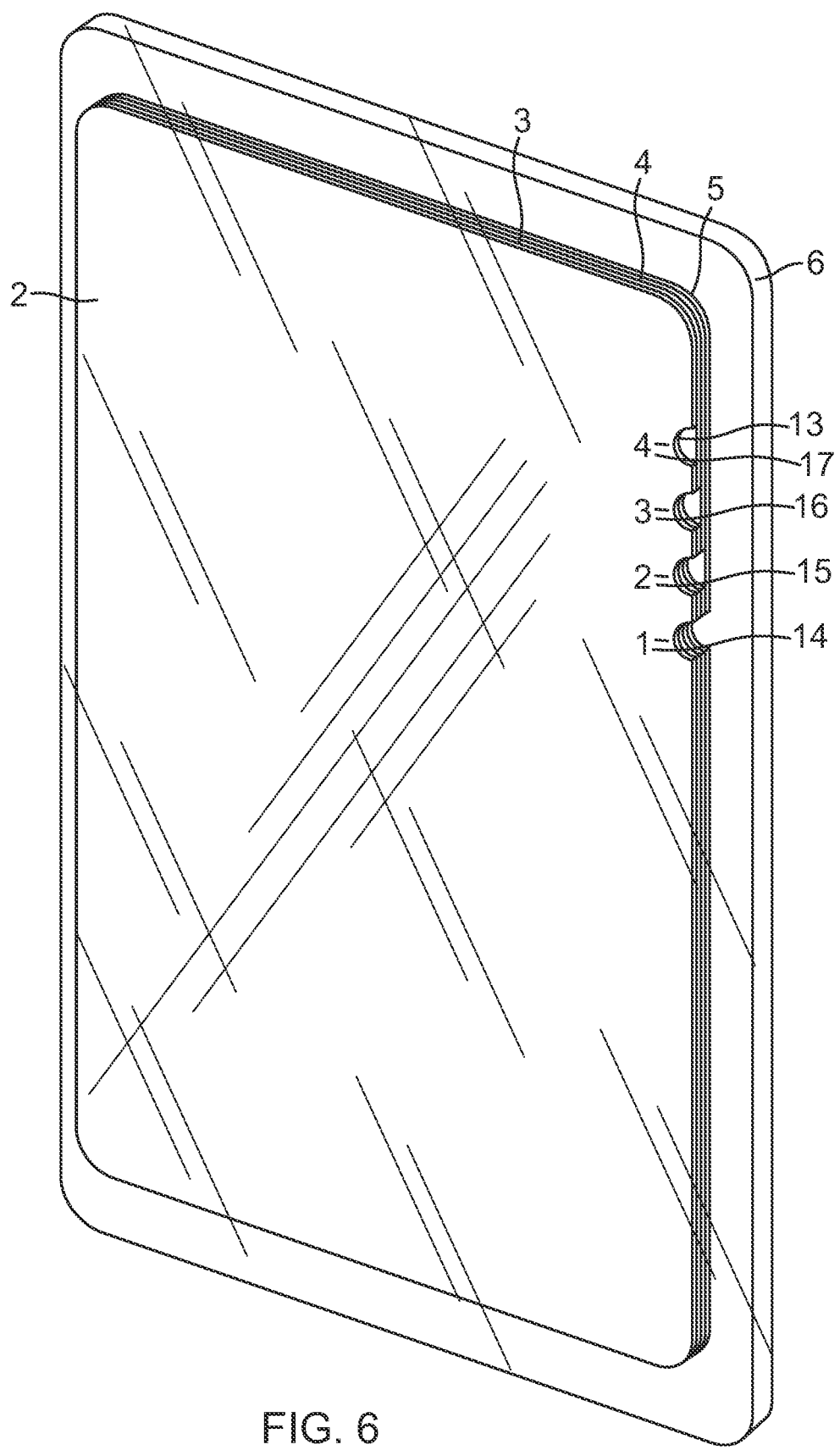
FIG. 6 is a perspective view of another anti-graffiti window film laminate system.

FIG. 6 is a perspective view of another anti-graffiti window film laminate system. This system is comprised of a transparent stack of sheets as previously described. The entire stack of disposable sheets is secured to a window to protect the window from graffiti and other damage to the window. Each sheet includes a crescent shaped aperture 13 to remove and dispose of each sheet. In close proximity to each crescent shaped aperture is a unique visual indicia 14, 15, 16, 17 in the form of a number, that is easily visible by the user. The number is laser cut only through their prospective layer. When the system is first placed on the desired surface, the sheets are stacked on top of each other and all removal apertures are visible. The top most sheet also displays all of the numbers of each of the sheets beneath it.

The visual indicia etched into the laminate by any method such as laser ablation, blade cutting, heat pressing, or any other similar method. Laser ablation may be used to cut the visual indicia into the laminate. Each layer is ablated with a different visual indicia that indicates the number of layers remaining. The visual indicia of the laminate conveniently aids in selectively removing only the topmost remaining layer from the rest of the polymeric laminate via tool or by hand. A first pass is made by the laser to selectively ablate the first layer of the polymeric laminate with a first visual indicia. The first layer is the topmost layer or the layer that is most proximate the laser etching device. A second ablation is made to the second layer, positioned adjacent to the first layer. The second ablation is contained only on the second layer and is a different visual indicia than the ablation on the first layer. The third layer is disposed below the second layer. A third ablation is made to the third layer and is contained only on the third layer. The fourth layer is disposed below the third layer. A fourth ablation is made to the fourth layer and is also only contained on the forth layer. The fourth or bottom layer is applied to a substrate surface to protect it. For example, the system is adhered to a glass or plastic window. The topmost sheet is peeled away and discarded in order to reveal a new, undamaged sheet below. The system protects the windows from vandalism or other surface damage by adhering the stack of sheets to the substrate to be protected and subsequently pulling a topmost sheet away from the stack after it becomes damaged. The visual indicia are illustrated as hash tags or numbers. However, the visual indicia can be any form that identifies numbers of remaining layers to the user. For example, the indicia can be dots, numbers, various marks, or shapes. The indicia can also be different color or font etchings. The only limitation in the type of etching is that the etchings are different in each layer so that a user can distinguish the number of remaining layers based on some understood parameters. The system can contain any number of disposable layers according to user preference. The minimum number of layers must be two (one top most layer and a bottom layer). However, the total number of layers can exceed the 4 layers illustrated in the above systems.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A polymeric film for placement on a window comprising:
    a first film having a first surface with a surface area and an opposite second surface with a second surface area, where the first film also contains an aperture on an edge of the first film and a first visual indicia etched in close proximity to the aperture;
    a second film having a first surface with a surface area and an opposite second surface with a second surface area, where the second film also contains an aperture on an edge of the second film and a second visual indicia that is different than the first visual indicia on the first film, and where the second visual indicia is in close proximity to the aperture;
    wherein the first film and the second film are releasably connected via adhesive contained between the first film and the second film; and
    wherein the first visual indicia is only etched on the first film and the second visual indicia is only etched on the second film.

2. The polymeric film of claim 1 further including a third film having a first surface with a surface area and an opposite second surface with a second surface area, where the third film also contains an aperture on an edge of the third film and a third visual indicia, that is different than the first visual indicia and second visual indicia, and where the third visual indicia is in close proximity to the aperture on the third film.

3. The polymeric film of claim 2 wherein the first visual indicia is a number, wherein the second visual indicia is a number different than the number on the first film, and wherein the third visual indicia is a number different than the number on the first film or the second film.

4. The polymeric film of claim 1 wherein the first visual indicia is a number.

5. The polymeric film of claim 4 wherein the second visual indicia is a number different than the number on the first film.

\* \* \* \* \*